INVENTORS
ROBERT EMMETT BURK and
GELU STOEFF STAMATOFF
BY
ATTORNEY

Patented Oct. 24, 1950

2,526,728

UNITED STATES PATENT OFFICE 2,526,728

GLASS LAMINATIONS AND INTERLAYERS THEREFOR

Robert Emmett Burk, Wilmington, Del., and Gelu Stoeff Stamatoff, Nutley, N. J., assignors to E. I. du Pont de Nemours & Company, Wilmington, Del., a corporation of Delaware Application August 19, 1948, Serial No. 45,014

11 Claims. (Cl. 154—2.77)

This invention relates to laminations containing a glass sheet and to interlayers for use in such laminations and, more particularly, to a safety glass lamination containing a polyvinyl butyral resin interlayer and having superior strength.

Safety glass is made by laminating glass sheets with sheets of tough adherent materials, such sheets normally being referred to as "interlayers." When such a lamination is subjected to an impact sufficient to fracture the glass sheets, the interlayer absorbs the energy of impact and prevents shattering of the lamination. The strength of a lamination is the measure of the ability of the lamination to absorb impact energy, the greater the strength of the lamination the greater is the impact energy that can be absorbed without failure of the lamination. This invention is concerned particularly with a safety glass having improved strength in contrast to presently available safety glass, and with the interlayer used therein.

An important object of the present invention is to provide a laminated glass of improved strength compared to the safety glass hertofore available and to provide an interlayer useful in the manufacture of such laminated glass. A further object is to improve the effective strength in laminated glass of polyvinyl butyral resin sheets of the type now used as interlayers. A further object is to provide a laminated glass having improved strength over a wide temperature range. Other objects will be apparent from the description of the invention given hereinafter.

The above objects are accomplished according to the present invention by laminating a glass sheet with a base layer sheet comprising a polyvinyl butyral resin having a hydroxyl content of 17%–20% and a plasticizer therefor, with an accommodation layer interposed between the two sheets, the accommodation layer comprising a polyvinyl butyral resin having a hydroxyl content of 10%–13.5%, and a plasticizer therefor. Although immaterial to this invention, normally a glass sheet is used on each side of the lamination and in such case it is preferred that an accommodation layer be interposed between each glass sheet and the base layer sheet. Multiple laminations using three or more glass sheets are also contemplated.

The present invention particularly resides in the accommodation layer in combination with the base sheet layer in laminated glass. This accommodation layer may be either a self-sustaining sheet or a coating applied to either the glass sheet or the base layer sheet. Preferably, it is a coating applied directly to the surface of the base layer sheet to form a composite interlayer sheet for laminated glass. In general, the base layer sheet is the conventional polyvinyl butyral resin sheet widely used as the interlayer in the laminated glass industry today and described in Reid U. S. Patent 2,120,628 and Robertson U. S. Patent 2,162,678. From studies of the lamination of the present invention it appears that the accommodation layer acts to distribute forces that prevail while the lamination is under stress and, therefore, it is referred to herein as an "accommodation layer."

The present invention involves the use of two particular types of polyvinyl butyral resin, the first being a polyvinyl butyral resin containing 17%–20% hydroxyl groups and used in the base layer sheet composition. The second type of polyvinyl butyral resin contains 10%–13.5% hydroxyl groups and is used in the accommodation layer composition. These polyvinyl acetals may be produced by methods described in the prior art. For example, in Stamatoff U. S. Patent 2,400,957, Example 1 illustrates the preparation of a polyvinyl butyral resin having a hydroxyl content within the range of 10%–13.5%, and Example 4 illustrates the method for preparing a polyvinyl butyral resin having a hydroxyl content within the range of 17%–20%.

The hydroxyl content of the polyvinyl butyral resin is calculated throughout the specification and claims as polyvinyl alcohol and this hydroxyl content may be determined by the following procedure: 1.000 gram of the polyvinyl butyral resin to be analyzed is dissolved in 25 milliliters of a solution containing, by weight, 88 parts pyridine and 12 parts acetic acid, and the solution placed in a bottle which is then sealed and heated in a boiling water bath for 1½ hours and then cooled. To the cooled solution there are added 20 drops of phenolphthalein indicator solution and 100 milliliters of 0.3 normal sodium hydroxide solution, and the bottle sides washed with 100 milliliters of methyl isobutyl ketone. The sample is then titrated with 0.3 normal sodium hydroxide to the phenolphthalein end point. A blank containing no resin is run under identical conditions and titrated as above, and the polyvinyl butyral resin hydroxyl content calculated as percent polyvinyl alcohol is determined as follows:

Hydroxyl content (% vinyl alcohol) =

1.32 [milliliters for blank — milliliters for sample]

Referring to the drawing forming a part of this application:

Figure 1:
Fig. 1 is a section through a laminated glass according to the present invention in which only a single sheet of glass is employed.
Figure 2:
Fig. 2 is a section through the interlayer used in the laminated glass shown in Fig. 1.

Referring to Fig. 1, reference numeral 1 indicates a sheet of glass and 3 indicates a polyvinyl butyral resin sheet such as heretofore has been used as the interlayer in laminated glass. Interposed between sheets 1 and 3 is the accommodation layer 2 which is directly in contact with both the glass sheet and the base layer sheet. Fig. 2 shows the interlayer per se, this being made up of the base layer sheet 3 and, in the form of a coating thereon, the accommodation layer 2.

Figure 3:
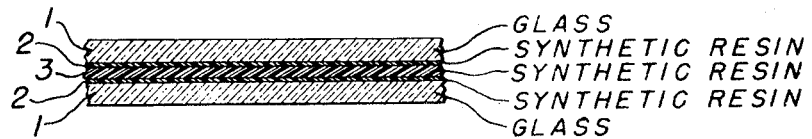
Fig. 3 is a second lamination according to the present invention employing two sheets of glass in the conventional safety glass construction.

Fig. 3 illustrates the conventional type of safety glass as modified by the present invention. This comprises the two glass sheets 1, the base layer sheet 3 and interposed between the base layer sheet 3 and each of the glass sheets 1, the accommodation layers 2.

The preferred relative thicknesses of the component parts of the laminated glass are only shown roughly in the drawing. The particular thickness of the glass sheets 1 is not critical nor does it form a part of this invention. The glass sheets, usually plate glass, will ordinarily be used in conventional thicknesses. Likewise, the thickness of the base layer sheet 3 is not critical and will ordinarily be that conventionally used in the art, that is, between 15 and 30 mils in thickness.

The thickness of the accommodation layers 2 is to a certain degree critical. A thickness of greater than 0.08 mil is preferably used because below that thickness it is difficult to deposit a layer of uniform thickness throughout and such uniformity is highly desirable. Further, lamination strength tends to decrease rapidly when the accommodation layer is decreased below 0.08 mil in thickness. There is no critical upper limit on the thickness of the accommodation layer but practically there is seldom any advantage in exceeding a thickness of 2 mils. Preferably, the accommodation layer is .1 mil to .5 mil in thickness.

The following examples in which all parts are given by weight unless otherwise stated, illustrate specific embodiments of the invention.

EXAMPLE I

The following were used: a base layer sheet 15 mils thick consisting of 43 parts of di(butoxy ethyl) adipate plasticizer and 100 parts of polyvinyl butyral resin of the following composition: ester content calculated as polyvinyl acetate 1%; hydroxyl content calculated as polyvinyl alcohol 19%; acetal content calculated as polyvinyl butyral 80%.

An accommodation layer composition consisting of 33.3 parts di(butoxy ethyl) adipate as plasticizer and 100 parts polyvinyl butyral resin of the following composition: ester content calculated as polyvinyl acetate 1%; hydroxyl content calculated as polyvinyl alcohol 11%; acetal content calculated as polyvinyl butyral 88%.

An interlayer was prepared by dipping the base layer sheet in a solution containing 100 parts of the accommodation layer composition dissolved in 888 parts of ethyl alcohol. The coated sheet was passed between parallel stripping bars spaced 18 mils apart, and seasoned in water for 4 minutes and dried at 60° C. for 2 hours.

Laminations were prepared by placing sheets of this interlayer between glass plates. To effect a preliminary composite these assemblies were pressed at 30 p. s. i. and 122° C. for 45 seconds. The composites were placed in an oil filled autoclave which was closed and sealed. The pressure within the autoclave was raised to 225 p. s. i. and the temperature of the oil raised to 135° C. The temperature of the oil was maintained at 135° C. for 7 minutes, and then reduced to 65° C. The pressure within the autoclave was released, and the samples removed, washed, and dried. Using this same procedure control laminations were prepared from glass plates and uncoated base layer sheets.

A large number of the laminations were tested at —18° C. and at 50° C. according to the following procedure: Laminations were conditioned for the cold test by being kept in a refrigerator at a temperature of —18° C. ±1° C. for 16 to 20 hours. Laminations were conditioned for the hot test by being kept in a hot water tank at 50° C. ±1° C. for 1 hour. A lamination measuring 1 foot square was placed in a frame which supported all edges, this frame being part of an apparatus constructed so that a steel ball could be dropped onto the center of the glass lamination from a predetermined height. The steel ball (½ pound) was dropped on the lamination from a predetermined height and the condition of the sample observed. No more than 10 seconds were allowed to elapse between removal of the sample from the conditioning tank or refrigerator and the impact of the steel ball on the sample. A lamination was considered to fail when the steel ball passed entirely through the lamination or when the lamination was ruptured into two or more separate and distinct pieces. The average break height recorded hereinafter is the height at which 50% of the laminations fail. A comparison of the lamination strength properties follows:

Table I

| Sample | Temperature | Average Break Height |
|---|---|---|
| | °C. | Feet |
| Example I | —18 | 31 |
| Control | —18 | 18 |
| Example I | 50 | 25 |
| Control | 50 | 20 |

The strength of the lamination of this example proved greater than the strength of the control lamination by 72% at —18° C. and by 25% at 50° C.

EXAMPLE II

The following were used: a base layer sheet 15 mils thick consisting of 43 parts di(butoxy ethyl) adipate as plasticizer and 100 parts of polyvinyl butyral resin of the following composition: ester content calculated as polyvinyl acetate 1%; hydroxyl content calculated as polyvinyl alcohol 19%; acetal content calculated as polyvinyl butyral 80%.

An accommodation layer composition consisting of 43 parts di(butoxy ethyl) adipate as plasticizer and 100 parts polyvinyl butyral resin of the following composition: ester content calculated as polyvinyl acetate 1%; hydroxyl content calculated as polyvinyl alcoohl 11.5%; acetal content calculated as polyvinyl butyral 87.5%.

An interlayer was prepared by dipping the base sheet layer in a solution containing 100 parts of the accommodation layer composition dissolved in 884 parts of ethyl alcohol. The coated sheet was passed between parallel stripping bars spaced 18 mils apart, and seasoned in water for 4 minutes and dried at 60° C. for 2 hours. Laminations and control laminations were prepared as in Example I.

The strength of the laminations compared to the control laminations was determined by the method described in Example I with the following results:

*Table II*

| Sample | Temperature | Average Break Height |
|---|---|---|
|  | °C. | Feet |
| Example II | −18 | 29 |
| Control | −18 | 18 |
| Example II | 50 | 26 |
| Control | 50 | 20 |

The strength of the lamination of this example proved greater than the strength of the control lamination by 61% at −18° C. and by 30% at 50° C.

EXAMPLE III

The following were used: a base layer sheet 15 mils thick consisting of 43 parts of di(butoxy ethyl) adipate as plasticizer and 100 parts of polyvinyl butyral resin of the following composition: ester content calculated as polyvinyl acetate 0.5%; hydroxyl content calculated as polyvinyl alcohol 20%; acetal content calculated as polyvinyl butyral 79.5%.

An accommodation layer consisting of polyvinyl butyral resin of the following composition: ester content calculated as polyvinyl acetate 0.5%; hydroxyl content calculated as polyvinyl alcohol 10%; acetal content calculated as polyvinyl butyral 89.5%.

An interlayer was prepared by passing the base layer sheet between coating rolls spaced 16 mils apart and disposed in a solution containing 100 parts of the accommodation layer composition dissolved in 789 parts of ethyl alcohol. The coating was smoothed by means of stationary bars parallel to and bearing against the coating surface, and the coated sheet was seasoned in water for 1½ hours, and dried at 67° C. for 2 hours.

Laminations and control laminations were prepared as in Example I. The accommodation layer of this example contains no plasticizer but this does not prevent the preparation of satisfactory laminates. Normally, these laminates do not immediately exhibit a strength improvement and strength improvement does not become apparent until the laminate has aged for a period of time to permit diffusion of plasticizer from the base layer sheet into the accommodation layer. Therefore, the laminations and the control laminations were permitted to age for 15 days and were then tested by the procedure described in Example I with the following results:

*Table III*

| Sample | Temperature | Average Break Height |
|---|---|---|
|  | °C. | Feet |
| Example III | −18 | 27 |
| Control | −18 | 17 |
| Example III | 50 | 26 |
| Control | 50 | 21 |

The strength of the lamination of this example proved greater than the strength of the control lamination by 59% at −18° C. and by 24% at 50° C.

EXAMPLE IV

The following were used: a base layer sheet 15 mils thick consisting of 43 parts of di(butoxy ethyl) adipate as plasticizer and 100 parts of polyvinyl butyral resin of the following composition: ester content calculated as polyvinyl acetate 0.5%; hydroxyl content calculated as polyvinyl alcohol 20%; acetal content calculated as polyvinyl butyral 79.5%.

An accommodation layer composition consisting of 33.3 parts di(butoxy ethyl) adipate as plasticizer and 100 parts polyvinyl butyral resin of the following composition: ester content calculated as polyvinyl acetate 0.5%; hydroxyl content calculated as polyvinyl alcohol 12%; acetal content calculated as polyvinyl butyral 87.5%.

An overcoating composition consisting of polyvinyl butyral resin of the following composition: ester content calculated as polyvinyl acetate 0.5%; hydroxyl content calculated as polyvinyl alcohol 20%; acetal content calculated as polyvinyl butyral 79.5%.

The base layer sheet was soaked in water, surface dried, and passed between coating rolls spaced 18 mils apart disposed in a coating solution containing 100 parts of the accommodation layer composition and 591 parts of ethyl alcohol. The coated sheet was seasoned in water for ½ hour, surface dried, and passed between coating rolls disposed in a solution containing 100 parts of the overcoating composition and 789 parts of ethyl alcohol. The treated sheet was then seasoned in water for 1 hour and dried at 50° C. for 2 hours. Laminations and control laminations were prepared and tested by the procedures of Example I with the following results:

*Table IV*

| Sample | Temperature | Average Break Height |
|---|---|---|
|  | °C. | Feet |
| Example IV | −18 | 25 |
| Control | −18 | 17 |
| Example IV | 50 | 25 |
| Control | 50 | 21 |

The strength of the lamination of this example proved greater than the strength of the control lamination by 47% at −18° C. and by 19% at 50° C. The interlayer of this example is surfaced with a polyvinyl butyral resin identical to that used in the base sheet composition. In some circumstances this is an advantage for the accommodation layer composition is normally

EXAMPLE V

The following were used: a base layer sheet 15 mils thick consisting of 43 parts of a plasticizer which is composed of the substantially neutral mixed esters of a fully esterified triethylene glycol with a mixture of caprylic and capric acids, said acids being in the proportion of 80–90% of caprylic and 20–10% of capric, and prepared as described in Strauss U. S. Patent 2,372,522, and 100 parts of polyvinyl butyral resin of the following composition: ester content calculated as polyvinyl acetate 0.5%; hydroxyl content calculated as polyvinyl alcohol 17%; acetal content calculated as polyvinyl butyral 82.5%.

An accommodation layer composition consisting of 43 parts of the plasticizer used in the base layer sheet and 100 parts of polyvinyl butyral resin of the following composition: ester content calculated as polyvinyl acetate 0.5%; hydroxyl content calculated as polyvinyl alcohol 12%; acetal content calculated as polyvinyl butyral 87.5%.

Glass plates were sprayed with a solution containing 100 parts of the accommodation layer composition dissolved in 710 parts of ethyl alcohol to produce coating thicknesses of 0.1 mil on some of the plates and 0.8 mil on other of the plates after seasoning. The coated glass plates were seasoned to remove solvent at 60° C. for 2 hours.

Laminations were prepared by placing pieces of the base layer sheet between the coated surface of the glass plates and proceeding as in Example I. These same conditions were used to prepare control laminations from uncoated glass plates and base layer sheet. The laminations and control laminations were strength tested by the procedure of Example I with the following results:

*Table V*

| Sample | Accommodation Layer Thickness | Temperature | Average Break Height |
|---|---|---|---|
| | Mil | °C. | |
| Example V | 0.1 | −18 | 28 |
| Do | 0.8 | −18 | 28 |
| Control | 0 | −18 | 18 |
| Example V | 0.1 | 50 | 27 |
| Do | 0.8 | 50 | 26 |
| Control | 0 | 50 | 22 |

These results show that the thickness of the accommodation layer coating at least within reasonable limits is not critical and that the laminations of this invention are substantially improved in strength over the control lamination at both test temperatures.

EXAMPLE VI

The following were used: a base layer sheet 15 mils thick consisting of 58.7 parts dibutyl phthalate as plasticizer and 100 parts of polyvinyl butyral resin of the following composition: ester content calculated as polyvinyl acetate 1%; hydroxyl content calculated as polyvinyl alcohol 19%, acetal content calculated as polyvinyl butyral 80%.

An accommodation layer composition consisting of 53.8 parts dibutyl phthalate as plasticizer and 100 parts polyvinyl butyral resin of the following composition: ester content calculated as polyvinyl acetate 1%; hydroxyl content calculated as polyvinyl alcohol 12.5%; acetal content calculated as polyvinyl butyral 86.5%.

Glass plates were sprayed with a solution containing 100 parts of the accommodation layer composition and 513 parts of ethyl alcohol, and the glass plates were dried for 2 hours at 25° C. The thickness of the dry coating was 0.4 mil. Laminations and control laminations were prepared as in Examples V and I and strength tested by the procedure of Example I with the following results:

*Table VI*

| Sample | Temperature | Average Break Height |
|---|---|---|
| | °C. | Feet |
| Example VI | −18 | 20 |
| Control | −18 | 12 |
| Example VI | 50 | 20 |
| Control | 50 | 16 |

The strength of the lamination of this example proved greater than the strength of the control lamination by 67% at −18° C. and by 25% at 50° C.

EXAMPLE VII

The following were used: a base layer sheet 15 mils thick consisting of 43 parts of di(butoxy ethyl) adipate as plasticizer and 100 parts of polyvinyl butyral resin of the following composition: ester content calculated as polyvinyl acetate 0.5%; hydroxyl content calculated as polyvinyl alcohol 17%; acetal content calculated as polyvinyl butyral 82.5%.

An accommodation layer composition consisting of 43 parts di(butoxy ethyl) adipate as plasticizer and 100 parts polyvinyl butyral resin of the following composition: ester content calculated as polyvinyl acetate 0.5%; hydroxyl content calculated as polyvinyl alcohol 13.2%; acetal content calculated as polyvinyl butyral 86.3%.

The base layer sheet was soaked in water, surface dried, and passed between coating rolls spaced 25 mils apart disposed in a coating solution containing 100 parts of the accommodation layer composition and 600 parts ethyl alcohol. The coating was smoothed by means of stationary bars parallel to and bearing against the coated surfaces and directly thereafter was sprayed with water. The coated sheet was seasoned in water for 1 hour at 25° C. and dried for 2 hours at 70° C. Laminations and control laminations were prepared and tested by the procedures of Example I with the following results:

TABLE VII

| Sample | Temperature | Average Break Height |
|---|---|---|
| | °C. | Feet |
| Example VII | −18 | 26 |
| Control | −18 | 20 |

The strength of the lamination of this example proved greater than the strength of the control lamination by 30% at −18° C.

It will be understood that the above examples are merely illustrative and that the invention broadly comprises a lamination including a glass sheet, a base layer sheet of a polyvinyl butyral resin having a hydroxyl content of 17%–20% and a plasticizer therefor, and an accommodation layer interposed between the two sheets, such accommodation layer comprising a polyvinyl butyral resin having a hydroxyl content of 10%–13.5% and a plasticizer therefor. The invention also comprises a composite interlayer sheet for laminated glass essentially composed of a base layer sheet as above and, superposed thereon, an accommodation layer as above.

The remarkable improvement in the strength of safety glass laminations effected by this invention is directly attributable to the hydroxyl content of the polyvinyl butyral resins used in the base layer sheet and the accommodation layer of the composite interlayer. As indicated in the examples, these resins may contain a limited proportion of ester groups or functional groups normally foreign to polyvinyl butyral resins provided that the proportion of these groups is not sufficient to affect the solubility or other characteristics of the resin. Such limited proportions of other groups are irrelevant and may be disregarded for present purposes.

The polyvinyl butyral resin of the base layer sheet should have a hydroxyl content within the limits of 17%–20%. Slightly higher than 20% hydroxyl content may be used successfully although there appears to be no advantage from exceeding 20% hydroxyl content, so that this upper limit is not as sharply critical as the lower limit. But if the hydroxyl content is below 17% in the polyvinyl butyral resin of the base layer sheet, the strength improvement of the laminations will not be obtained. Polyvinyl butyral resin having a hydroxyl content from 17%–20% when compounded with suitable plasticizer, will normally have an ultimate strength greater than 2000 p.s.i. and an ultimate elongation than 200%. Because of this astonishing strength, the base layer sheet is the strengthening portion of the interlayer and serves to absorb applied stresses when the lamination containing the interlayer is subjected to an impact.

The polyvinyl butyral resin used in the accommodation layer should definitely have a hydroxyl content of 10%–13.5%. These limitations are critical and unless they are observed substantially no strength improvement over heretofore known conventional safety glass will result. Compositions of polyvinyl butyral resin having a hydroxyl content of 10%–13.5% with suitable plasticizers, are quite low in tensile and shear strengths and are usually soft. Due to the characteristics of these compositions, the accommodation layer in the lamination apparently serves as a compensating means in the interlayer whereby stresses applied to the laminations are distributed, thereby permitting more efficient absorption of these stresses by the base layer sheet with the resulting improvement in the strength of the lamination.

While the presence of a plasticizer in both the base layer sheet and the accommodation layer in the ultimate laminated product is essential, the use of plasticizers in the interlayer art is so well known that selection of a suitable plasticizer or plasticizers presents no problem. A different plasticizer may be used in the base layer sheet from that used in the accommodation layer but it is preferred to use the same plasticizer in each.

The plasticizer should be compatible with both the high hydroxyl content polyvinyl butyral resin of the base layer sheet and the low hydroxyl content polyvinyl butyral resin of the accommodation layer. It is immaterial whether the plasticizer will dissolve the low hydroxyl content resin or not at ordinary temperatures but it should not dissolve the high hydroxyl content resin at such temperatures. Any plasticizer used should be acceptable with respect to color, stability, chemical inertness, and the like, and should be of low volatility, the usual requirements of any plasticizer used in conventional polyvinyl butyral interlayer sheeting. Preferably, the plasticizer selected should be water-insoluble and one in which polyvinyl butyral resin having a hydroxyl content of 17% to 20% is insoluble below 40° C. but with which this resin can be compounded to yield compatible homogeneous compositions. Such a plasticizer normally will dissolve polyvinyl butyral resin of 10%–13.5% hydroxyl content at temperatures below 40° C. and will at least be suitably compatible therewith.

As a matter of selecting a plasticizer from those disclosed in the art, a simple test is as follows: 1 gram of polyvinyl butyral resin having a hydroxyl content of 17%–20% is mixed with 25 milliliters of the candidate plasticizer in a test tube of one inch inside diameter with heating until a clear and homogeneous mixture is obtained. This is then allowed to cool with stirring by an ordinary laboratory thermometer. If the mixture on cooling is clear at 110° C. and becomes sufficiently opaque so that the mercury column of the thermometer becomes invisible through the mixture before the temperature of the mixture drops below 40° C., then the plasticizer may be regarded as suitable for use in formulating the resin compositions of this invention. When this same test is applied to a polyvinyl butyral resin of 10%–13.5% hydroxyl content, it will be found that normally the plasticizer resin mixture remains sufficiently clear so that the mercury column of the thermometer is visible through the mixture when the temperature has dropped below 40° C. Plasticizers which satisfy both of these tests are most desirably used in this invention.

It would be impractical to list individually all of the plasticizers suitable for use in this invention and would serve no purpose as one skilled in the art can readily select a suitable plasticizer from the many already known. However, the suitable plasticizers are, in general, water-insoluble ester plasticizers and they include dibutyl phthalate, dibutyl sebacate, dimethyl phthalate, di(butoxy ethyl) adipate, di(butoxy ethyl) sebacate, methyl palmitate, methoxy ethyl palmitate, triethylene glycol dibutyrate, triethylene di(2-ethyl butyrate), triethylene glycol diacetate, tricresyl phosphate, triethyl citrate, dibutyryl lactate, ethyl paratoluene sulfamide, dibutyl sulphone, lauryl alcohol, oleyl alcohol, glycerol triricinoleate, methyl lauroyl glycolate, butyl octanoyl glycolate, and butyl laurate. The preferred plasticizers are alkyl esters of dicarboxylic acids, especially the aliphatic alkyl esters of dicarboxylic acids, monocarboxylic aliphatic acid esters of gylcols and ether glycols, alkoxy alkyl esters of dicarboxylic acids, and alkyl acyl glycolates.

The proportion of plasticizer is not critical and, preferably, will amount to 20%–45% by combined weight of the resin and plasticizer, this being the conventional proportion of plasticizer used in interlayer sheeting heretofore known. The plasticizer will normally migrate from one layer to the other until substantial equilibrium of plasticizer content results. Because of this and the fact that the base layer sheet is appreciably thicker than the accommodation layer, it is feasible to practice the invention as in Example III by omitting all plasticizer from the accommodation layer; within a short time after contact with the base layer, the accommodation layer will contain substantially the same percentage of plasticizer as the base layer sheet due to the migration of the plasticizer. However, it is generally preferred to incorporate the same proportion of plasticizer in both the low and high hydroxyl content resins.

As the art will recognize, the composition for both the accommodation layer and the base layer sheet will be essentially composed of the polyvinyl butyral resin and a plasticizer. The addition of stabilizers or the like in minor amounts is not excluded but such additions form no part of the present invention nor is it necessary to depart from normal practice in the safety glass interlayer art in this regard because of the present invention.

A preferred method for forming the base layer sheet is by extrusion of a suitable composition through an orifice. The extrusion process disclosed in Crane and Fields U. S. Patent 2,156,564, is preferred for this purpose although several other processes of forming sheets are known such as sheet casting on a drum or belt, and planing sheets from homogeneous compacted blocks of base layer sheet composition.

The accommodation layer may also be formed as a separate prefabricated sheet, and this sheet composited with the base layer. For economy this is not a preferred method and furthermore the thickness of the accommodation layer where this method is employed, would be considerably greater than necessary. The accommodation layer is best applied by a coating technique, both melt and solvent coating methods being available. The preferred method comprises solvent coating and any conventional technique for solvent coating is useable.

Several techniques have been illustrated in the foregoing examples such as dip, roll and spray coating but other methods such as brush coating and transfer coating may be employed. It has been found advantageous although not necessary to presoak the base layer sheet in water prior to the coating step in order to control penetration of the solvents employed in the coating composition. As an alternate, glass plates may be coated with the accommodation layer composition and these laminated to uncoated base layer sheets. Further, a composite interlayer comprising a base layer sheet with a superposed accommodation layer may be overcoated with a solution of the resin composition of the base layer sheet as illustrated in Example IV. The advantage in this is primarily to reduce the tackiness of the interlayer as the accommodation layer bonds entirely satisfactorily to the glass sheets in the course of the conventional laminating technique used in the art.

The outstanding advantage of this invention resides in the improved strength of the safety glass laminations. By use of the present invention it has been found that laminations having strength improvements from 35%–75% at —18° C., with an average improvement of about 40%, and from 15%–30% at 50° C., with an average improvement of about 20%, over conventional safety glass laminations may be readily obtained. This strength improvement in the laminations of this invention represents a substantially increased safety factor in the prevention of personal injury to automobile occupants. Further, the invention is particularly practical in that it may be carried out with a minimum disturbance to the currently used methods of manufacturing safety glass and with little added expense.

As many apparently widely different embodiments of this invention may be made without departing from the spirit and scope thereof, it is to be understood that the invention is not limited to the specific embodiments thereof except as defined in the appended claims.

We claim:

1. A laminated article comprising a glass sheet, a sheet comprising a polyvinyl butyral resin having a hydroxyl content of 17%–20%, and a plasticizer therefor, and an accommodation layer interposed between said sheets, said accommodation layer comprising a polyvinyl butyral resin having a hydroxyl content of 10%–13.5%, and a plasticizer therefor.

2. A laminated article comprising a glass sheet, a sheet comprising a polyvinyl butyral resin having a hydroxyl content of 17%–20%, and a plasticizer therefor, and an accommodation layer of 0.08 mil to 2 mils in thickness interposed between said sheets, said accommodation layer comprising a polyvinyl butyral resin having a hydroxyl content of 10%–13.5%, and a plasticizer therefor.

3. A laminated article comprising a glass sheet, a sheet comprising a polyvinyl butyral resin having a hydroxyl content of 17%–20%, and a plasticizer therefor, and an accommodation layer of .1 mil to .5 mil in thickness interposed between said sheets, said accommodation layer comprising a polyvinyl butyral resin having a hydroxyl content of 10%–13.5%, and a plasticizer therefor.

4. A laminated article comprising a glass sheet, a sheet comprising a polyvinyl butyral resin having a hydroxyl content of 17%–20%, and a plasticizer therefor, and an accommodation layer interposed between said sheets, said accommodation layer comprising a polyvinyl butyral resin having a hydroxyl content of 10%–13.5%, and a plasticizer therefor, the plasticizer in each case being the same and in the proportion of 20%–45% of the combined weight of the resin and plasticizer.

5. A laminated article comprising a glass sheet, a sheet comprising a polyvinyl butyral resin having a hydroxyl content of 17%–20%, and a plasticizer therefor, and an accommodation layer of .1 mil to .5 mil in thickness interposed between said sheets, said accommodation layer comprising a polyvinyl butyral resin having a hydroxyl content of 10%–13.5%, and a plasticizer therefor, the plasticizer in each case being the same and in the proportion of 20%–45% of the combined weight of the resin and plasticizer.

6. An interlayer for laminated glass comprising a base layer sheet of a polyvinyl butyral resin having a hydroxyl content of 17%–20%, and a plasticizer therefor, and an accommodation layer superposed thereon of a polyvinyl butyral resin having a hydroxyl content of 10%–13.5%.

7. An interlayer for laminated glass comprising a base layer sheet of a polyvinyl butyral resin having a hydroxyl content of 17%–20%, and a plasticizer therefor, and an accommodation layer superposed thereon of a polyvinyl butyral resin having a hydroxyl content of 10%–13.5%, and a plasticizer therefor.

8. An interlayer for laminated glass comprising a base layer sheet of a polyvinyl butyral resin having a hydroxyl content of 17%–20%, and a plasticizer therefor, and an accommodation layer of 0.08 mil to 2 mils in thickness superposed thereon of a polyvinyl butyral resin having a hydroxyl content of 10%–13.5%, and a plasticizer therefor.

9. An interlayer for laminated glass comprising a base layer sheet of a polyvinyl butyral resin having a hydroxyl content of 17%–20%, and a plasticizer therefor, and an accommodation layer of .1 mil to .5 mil in thickness superposed thereon of a polyvinyl butyral resin having a hydroxyl content of 10%–13.5%, and a plasticizer therefor.

10. An interlayer for laminated glass comprising a base layer sheet of a polyvinyl butyral resin having a hydroxyl content of 17%–20%, and a plasticizer therefor, and an accommodation layer superposed thereon of a polyvinyl butyral resin having a hydroxyl content of 10%–13.5%, and a plasticizer therefor, the plasticizer in each case being the same and in the proportion of 20%–45% of the combined weight of the resin and plasticizer.

11. An interlayer for laminated glass comprising a base layer sheet of a polyvinyl butyral resin having a hydroxyl content of 17%–20%, and a plasticizer therefor, and an accommodation layer of .1 mil to .5 mil in thickness superposed thereon of a polyvinyl butyral resin having a hydroxyl content of 10%–13.5%, and a plasticizer therefor, the plasticizer in each case being the same and in the proportion of 20%–45% of the combined weight of the resin and plasticizer.

ROBERT EMMETT BURK.
GELU STOEFF STAMATOFF.

REFERENCES CITED

The following references are of record in the file of this patent:

UNITED STATES PATENTS

| Number | Name | Date |
| --- | --- | --- |
| 2,113,767 | Paggi | Apr. 12, 1938 |
| 2,124,315 | Ryan | July 19, 1938 |
| 2,176,997 | Marini | Oct. 24, 1939 |
| 2,184,876 | Sherts | Dec. 26, 1939 |
| 2,200,969 | Ryan | May 14, 1940 |
| 2,258,991 | McNally | Oct. 14, 1941 |
| 2,274,706 | Keim | Mar. 3, 1942 |
| 2,318,959 | Muskat | May 11, 1943 |
| 2,400,957 | Stamatoff | May 28, 1946 |
| 2,453,308 | Dunlop | Nov. 9, 1948 |

FOREIGN PATENTS

| Number | Country | Date |
| --- | --- | --- |
| 461,201 | Great Britain | Feb. 22, 1937 |